(12) United States Patent
Corsi et al.

(10) Patent No.: US 8,819,988 B2
(45) Date of Patent: Sep. 2, 2014

(54) METHOD AND SYSTEM FOR ORGANIC CULTIVATING AND ENVIRONMENTAL CONTROL OF CONTAINER GROWN PLANTS

(76) Inventors: Michael Corsi, Jamestown, RI (US); Stephen Doyle, Warwick, RI (US)

(*) Notice: Subject to any disclaimer, the term of this patent is extended or adjusted under 35 U.S.C. 154(b) by 303 days.

(21) Appl. No.: 12/911,849

(22) Filed: Oct. 26, 2010

(65) Prior Publication Data

US 2011/0096454 A1 Apr. 28, 2011

Related U.S. Application Data

(60) Provisional application No. 61/255,255, filed on Oct. 27, 2009.

(51) Int. Cl.
*A01G 7/04* (2006.01)

(52) U.S. Cl.
CPC .................................... *A01G 7/04* (2013.01)
USPC ............................................................ 47/1.3

(58) Field of Classification Search
USPC ............... 47/1.3; 361/222, 212, 220; 439/106
See application file for complete search history.

(56) References Cited

U.S. PATENT DOCUMENTS

| | | | | |
|---|---|---|---|---|
| 3,619,773 A | * | 11/1971 | Lathrop | 324/510 |
| 3,842,539 A | | 10/1974 | Sacalis | |
| 4,020,417 A | * | 4/1977 | Brehob et al. | 324/694 |
| 4,450,498 A | | 5/1984 | Siegal | |
| 4,861,940 A | * | 8/1989 | Carpenter, Jr. | 174/6 |
| 4,873,608 A | * | 10/1989 | Yoshimura | 361/220 |
| 5,450,859 A | | 9/1995 | Litovitz | |
| 5,464,456 A | | 11/1995 | Kertz | |
| 5,544,665 A | | 8/1996 | Litovitz et al. | |
| 6,331,927 B1 | | 12/2001 | Overgaard | |
| 6,542,347 B1 | * | 4/2003 | Young | 361/115 |
| 6,683,779 B2 | * | 1/2004 | Ober | 361/220 |

(Continued)

FOREIGN PATENT DOCUMENTS

| JP | 2002017164 A | * | 1/2002 | ............... A01G 7/04 |
|---|---|---|---|---|
| WO | WO 2007046155 A1 | * | 4/2007 | ............... A01G 7/04 |

OTHER PUBLICATIONS

Aladjadjiyan, A., "The Use of Physical Methods for Plant Growing Stimulation in Bulgaria", Journal Central European Agriculture, vol. 8 (2007) No. 3 (369-380).

(Continued)

*Primary Examiner* — David Parsley
*Assistant Examiner* — Danielle Clerkley
(74) *Attorney, Agent, or Firm* — Barlow, Josephs & Holmes, Ltd.

(57) ABSTRACT

A method and system is provided whereby the environment of the container grown plant is controlled to replicate a natural environment. Since container grown plants are not in direct contact with the soil in the earth, a container grown plant can develop its own local electrical field and static charge that can hinder the development of the plant. A plant media grounding device is provided in which copper prongs fit into a housing that is connected to a power cord. The prongs are inserted at the plant's base in the growing media. The power cord is plugged into an outlet. The plant then becomes grounded to the earth ground of the building's power distribution system. In a further embodiment, the plant media grounding device may further include a variety of sensors in order to monitor the progress of the plant and the plant's environment.

15 Claims, 4 Drawing Sheets

(56) References Cited

U.S. PATENT DOCUMENTS

| | | | | |
|---|---|---|---|---|
| 6,828,796 | B2* | 12/2004 | Vang | 324/508 |
| 6,975,236 | B2* | 12/2005 | Staples | 340/602 |
| 6,987,659 | B1* | 1/2006 | Epstein | 361/220 |
| 7,057,401 | B2* | 6/2006 | Blades | 324/713 |
| 7,349,194 | B2 | 3/2008 | Elliott | |
| 7,724,491 | B2* | 5/2010 | Ober et al. | 361/220 |
| 8,305,214 | B2* | 11/2012 | Hyde et al. | 340/572.1 |
| 2007/0266624 | A1* | 11/2007 | Tanaka | 47/1.3 |

OTHER PUBLICATIONS

Horan, P. K., et al., "Stability of Radiation-Induced Organic Free Radicals", Biophysical Journal, vol. 8 1968 p. 164-174.

Nelson, R. A., "Electro-Culture—Stimulation of plant growth with electricity magnet—The Electrical Tickle", http:llblog.lege.net/content/stimulatingplantgrowthwithelectricitymagnet.

Gaafar, E. et al., "Stimulation and Control of *E. coli* by Using an Extremely low frequency magnetic field", Romanian J. Biophys., vol. 16, No. 4, p. 283-296, Bucharest, 2006.

Litovitz, T. A., et al., "Temporally Incoherent Magnetic Fields Mitigate the Response of Biological Systems to Temporally Coherent Magnetic Fields", Bioelectromagnetics 15:399-409 (1994) Wiley-Liss, Inc.

Tien, P. et al., "The Influences of Extremely Low Frequency AC Magnetic Fields At 60Hz on Mung Beans Growth", Marsland Press, Journal of American Science 2009: 5(1), 49-54.

Desrosiers, Mark F. and Bandurski, Robert S., "Effect of a Longitudinally Applied Voltage Upon the Growth of *Zea mays* Seedlings" Plant Physiol (1988) 87, 874-877.

Wellman, Nicole, Fortun, Susana M., and McLeod, Bruce R., "Bacterial Biofilms and the Bioelectric Effect", Antimicrobal Agents and Chemotherapy, Sep. 1996, p. 2012-2014, 1996 American Society for Microbiology, vol. 40, No. 9.

Adair, Robert K., "Biological responses to weak 60-Hz electric and magnetic fields must vary as the square of the field strength", Proc. Natl. Acad. Sci. USA, vol. 91, pp. 9422-9425, Sep. 1994, Biophysics.

Shabrangi, A., and Majd, A., "Comparing Effects of Electromagnetic Fields (60 Hz) on Seed Germination and Seedling Development in Monocotyledons and Dicotyledons", PIERS Proceedings, Moscow, Russia, Aug. 18-21, 2009.

Filek, M. et al., "Electric current affects the rate of development in isolated apical parts of rape in vitro", Biologia Plantarum 50 (3); 465-468, 2006.

Glass, H. Bentley, "Effect of Light on the Bioelectric Potentials of Isolated Elodea Leaves", Plant Physiology, p. 263-273.

Davies, MS, "Effects of 60 Hz electromagnetic fields on early growth in three plant species and a replication of previous results", PubMed, Bioelectromagnetics. 1996; 17(2): 154-61.

Davis, C. P. et al., "Effects of Microamperage, Medium, and Bacterial Concentration on Iontophoretic Killing of Bacteria in Fluid", Antimicrobial Agents and Chemotherapy, Apr. 1989, p. 442-447, vol. 33, No. 4, 1989 American Society for Microbiology.

Hulsheger, H. et al., "Electric field effects on bacteria and yeast cells", PubMed, Radiat Environ Biophys, 1983;22 (2): 149-62.

Graziana, A., et al., "External Electric Fields Stimulate the Electrogenic Calcium/Sodium Exchange in Plant Protoplasts", Biochemistry 1990, 29, 8313-8318.

Kell, Douglas B., "Forces, Fluxes and the Control of Microbial Growth and Metabolism" Journal of General Microbiology (1987), 133, 1651-1665.

Squier, George O. General, "George O. Squier: Tree Antennas", Scientific American (Jul. 14, 1991, p. 624.

Isakhanyan, V. and Trchunyan, A., "Indirect and Repeated Extremely High Frequency Electromagnetic Irradiation of Bacteria *Escherichia coli*", Dept. of Biophysics, Yerevan State University, 375025 Armenia, Oct. 14, 2004.

Stone, George E., "Influence of Electricity on Micro-organisms", Botanical Gazette, vol. 48, No. 5 (Nov. 1909), pp. 359-379.

Costerton, J. William et al., "Mechanism of Electrical Enhancement of Efficacy of Antibiotics in Killing Biofilm Bacteria", Antimicrobial Agents and Chemotherapy, Dec. 1994, p. 2803-3809, vol. 38, No. 12, 1994 American Society for Microbiology.

Giladi, M., et al., "Microbial Growth Inhibition by Alternating Electric Fields", Antimicrobial Agents and Chemotherapy, Oct. 2008, p. 3517-3522, vol. 52, No. 10, 2008 American Society for Microbiology.

Giladi, M., et al., "Microbial Growth Inhibition by Alternating Electric Fields", AAC Accepts, published online ahead of print on Jul. 28, 2008, Antimicrobial Agents and Chemotherapy, 2008 American Society for Microbiology and/or Listed Authors/Institutions.

\* cited by examiner

METHOD AND SYSTEM FOR ORGANIC CULTIVATING AND ENVIRONMENTAL CONTROL OF CONTAINER GROWN PLANTS

CROSS-REFERENCE TO RELATED APPLICATIONS

This application is related to and claims priority from earlier filed U.S. Provisional Patent Application No. 61/255,255, filed Oct. 27, 2009, the contents of which are incorporated herein by reference.

BACKGROUND OF THE INVENTION

The present invention relates generally to a method and system for improved organic cultivation and environmental control over container grown plants. More specifically, the present invention relates to a method and system whereby the environment of the container grown plant is controlled in a manner that replicates a natural environment to maximize the health, quality and yield of the plant.

The human species began its ascent to becoming the dominant species on the surface of the earth in large part due to its development of agricultural techniques that allowed them to remain in one place. The ability to grow plants under controlled conditions and to domesticate animals allowed groups of humans to remain in a particular location for extended periods of time and to generate greater amounts of food than were necessary for immediate consumption. One can appreciate, therefore, that the necessity for producing food under controlled conditions, particularly under adverse conditions, has remained a priority of the species since prehistoric times. To meet these needs, artificial growing environments, ranging from those found in ordinary greenhouses to those found in restricted circumstances such as caves, submarines and the like are utilized and are desirable for a variety of reasons. One of the primary reasons for controlled situs agriculture is to produce food for those who are cut off from ordinary sources of fresh produce. This is particularly important in the consideration of long term space voyages and permanent stations, in which the difficulties of transporting fresh produce to the inhabitants will be extremely high.

While methods are being developed to allow the growth of plants in remote controlled locations such methods create separation between the plant and the Earth itself. In large part, via civilization, humans in particular have lost what was once a natural connectedness with earth by adopting insulating clothing and habitat. This is to say that the typical civilized man no longer walks barefoot and no longer sits or sleeps on the ground. Floors, furniture, beds, clothing, and in particular, shoes, are typically highly insulating, cutting off an effective electrical connection between human and ground. Similarly, container grown plants often share this condition. What is neglected in these methods and systems is the fact that all terrestrial organisms have an electrical relationship with earth. In their native environments, all flora and fauna are in electrical contact with earth, either directly, as in standing or lying on the ground, immersed in water, or indirectly, as in perched above ground in a plant, a simple example being an arbor dwelling bird.

A variety of prior art methods have attempted to grow plants of different types under controlled conditions. These have included a number of developments in the field of hydroponics and a large variety of efforts relating to the growth of algae and plankton. Some of these methods have been implemented into specific structures that are utilized for efficient growth of plants under limited and adverse conditions.

Plants which are grown under controlled conditions in environmental isolation are subject to limitation in receiving adequate supplies of four primary growth requirements. For most plants, these requirements include light (electromagnetic radiation in the appropriate wavelengths for providing photosynthesis); carbon dioxide (ordinarily available through the ambient air); water and growth support nutrients. Beyond this, the plants must also have sufficient room to grow in a natural fashion and must have physical support.

One particular area in which a variety of techniques have been utilized is in the provision of light. It is well known among greenhouse operators that, for example, plant growth stimulation may be achieved by modifying the nature and duration of light that is provided to the plants. Further, the intensity and concentration of the electromagnetic energy is also important in achieving proper growth. For example, it has been found that direct radiation can be much less efficient in achieving significant and even growth in a wide variety of plants than is diffuse radiation.

While such growers have analyzed the differences in the effects of the manner in which electromagnetic energy is delivered to the plants, little effort has been dedicated to the manner in which a plant ultimately dissipates such energy when in a natural environment. It is of further note that despite many advances in the art, there remains a great deal of room for improvement in providing methods for growing plants in confined conditions in a manner that best replicates their natural environment.

Interestingly, the bio-energetic system of these plants responds dramatically to relatively small changes in the impedance between themselves and earth ground, ramping up or ramping down energy production and internal impedance as a function of connectedness. In particular, it is important that the organism be grounded during times of high stress or trauma. This is because bio-potential increases dramatically during these times. Container grown plants can particularly suffer from stresses because they are insulated and these strong bio-currents are not effectively dissipated.

One method typically employed in the prior art to protect living systems from the detrimental effects of fields is to shield the field source. The shielding collects the energy of the field, and then typically grounds it. In practice shielding is impractical because it must completely cover a field source in order to contain the field. The field will radiate through any openings in the shield. In reality, devices cannot be entirely shielded. Therefore, while the shielding method can reduce the field it does not entirely eliminate it or its potentially hazardous attributes.

Another method typically used in the prior art to protect living systems from electromagnetic fields is to balance the field from the source so that the source effectively cancels its own field, thus ideally producing no offending field. For instance, the AC power distribution to homes and industries is typically carried over unshielded bare copper wires, suspended in the air from towers. These lines are usually either two-phase or three-phase. Theoretically these lines can be arranged physically and by phase such that the EMF fields produced by the individual lines are each canceled by the other power line(s). In practice, however, this power cancellation is not complete and an ambient field still results. Also, the costs involved to produce a power distribution system such as this is prohibitively high.

There is therefore a need for a method and system for improved organic cultivation and environmental control over container grown plants that better replicates a natural environment. More specifically, there is a need for a method and system whereby the environment of the container grown plant is carefully controlled to allow the plant to dissipate stored electromagnetic energy in a manner that best replicates a natural environment to maximize the health, quality and yield of the plant.

BRIEF SUMMARY OF THE INVENTION

In this regard, the present invention provides a method and system for improved organic cultivation and environmental control over container grown plants. More specifically, the present invention provides a method and system whereby the environment of the container grown plant is carefully controlled to best replicate a natural environment in order to maximize the health, quality and yield of the plant. The system more particularly consists of a device that is employed to address missing facets relating to a container grown plant's environment.

It must be noted that normally container grown plants are not in direct contact with the soil in the earth. As a result, there is no electrical connection therebetween. This lack of electrical contact allows the container grown plant to develop its own local electrical field and static charge, which may or may not match the charge traditionally found in the outdoor environment. This mismatch in charges can hinder the development of the plant. To resolve this, the present invention provides a plant media grounding device in which copper prongs fit into a housing, such as a plastic housing, that is connected to a power cord. The prongs are inserted at the plant's base in the growing media. The power cord is plugged into an outlet. The plant then becomes grounded to the Earth ground of the building's power distribution system. Certainly, the grounding system may be accomplished using various designs including but not limited to one and/or two pronged grounding devices, propagation flats, plant carrier trays and vases for cut flowers. Each unit can be inter-connected using a power extension cord.

In a further embodiment, the plant media grounding device may further include a variety of sensors in order to monitor the progress of the plant and the plant's environment. The device in this embodiment contains sensors capable of recognizing the plant's environment (and potentially variations in the plant itself). When the plant's environment changes out of an optimal range, an "alarm" sounds that will be interfaced to a wireless antennae. This alarm or signal can be interfaced with a PLC or some form of logic device/controller, which in turn actuates various components of an integrated system, thus allowing the plant to directly control its environment or communicate with a computer for facility networked operation. For example, if the plant needs water, the appropriate sensor will trigger the PLC, which will relay the message to the irrigation system, and the plant will drink until it is satisfied. The PLC could also send an email or collect live feedback data that can be constantly recorded and monitored by a computer.

In view of the foregoing, it is an object of the present invention to provide a method and system for improved organic cultivation and environmental control over container grown plants that replicates a natural environment. It is a further object of the present invention to provide a method and system whereby the environment of the container grown plant is carefully controlled to allow the plant to dissipate stored electromagnetic energy in a manner that best replicates a natural environment to maximize the health, quality and yield of the plant.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Figure 1:
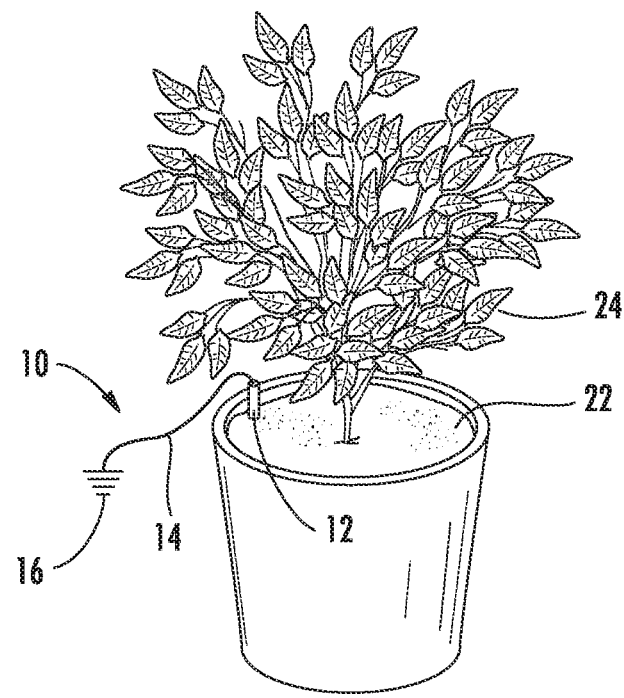
FIG. 1 is a front perspective view of the plant media grounding device of the present invention.

Now referring to the drawings, the plant media grounding device of the present invention is shown and generally illustrated in the figures. As can be seen the principal component of the plant media grounding device is the grounding component that is installed into the plant media. Further, an interface is provided that serves to connect the grounding component with an earth grounded system such as a standard household electrical receptacle or outlet. In this manner, the present invention provides a method and system for improved organic cultivation and environmental control over container grown plants whereby the environment of the container grown plant is carefully controlled to best replicate a natural environment in order to maximize the health, quality and yield of the plant.

As was stated above, container grown plants are not generally in direct contact with the soil in the earth. As a result, there is no electrical connection therebetween. This lack of electrical contact allows the container grown plant to develop its own local electrical field and static charge, which may or may not match the charge traditionally found in the outdoor environment. This mismatch in charges can hinder the development of the plant. To resolve this, as depicted at FIG. 1, the present invention provides a plant media grounding device 10 in which a grounding interface 12 is inserted into the plant growing medium. The grounding interface 12 may take any form suitable for the purpose of creating an electrical grounding interface with the plant growing medium including a rod, a plate, a probe, a spade, a tube or a mesh material. Further, the grounding interface 12 may be formed from any electrically conductive material such as a metal or electrically conductive carbon composite. Most preferably the grounding interface 12 is formed from copper.

Figure 2:
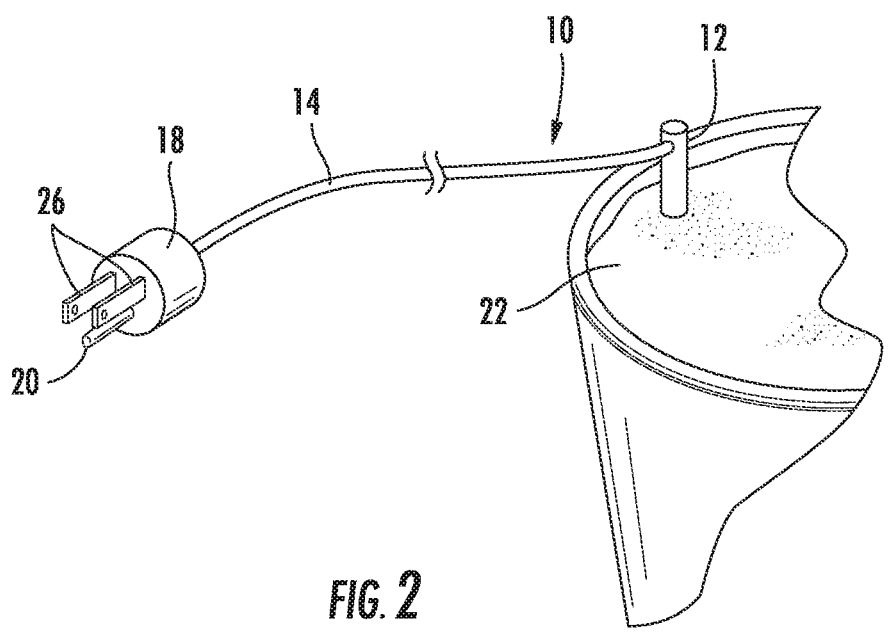
FIG. 2 is a closer view of plant media grounding device of the present invention.

The grounding interface 12 in turn is connected to an interface cord 14 that serves to connect the grounding interface 12 with an earth ground 16. It is preferable that the end of the interface cord 14 is formed as a male plug such as a standard electrical plug 18 as shown at FIG. 2. In such an arrangement, the interface cord 14 is in electrical communication with the grounding prong 20 of the plug 18. The grounding prong 20 when inserted into a standard household duplex receptacle is in turn in electrical communication with the electrical grounding system of the building as is well known in the art. Once the grounding interface 12 is installed into the plant media 22 and the cord 14 is plugged into the receptacle, the plant 24 becomes grounded to the earth ground of the building's power distribution system.

Figure 3:
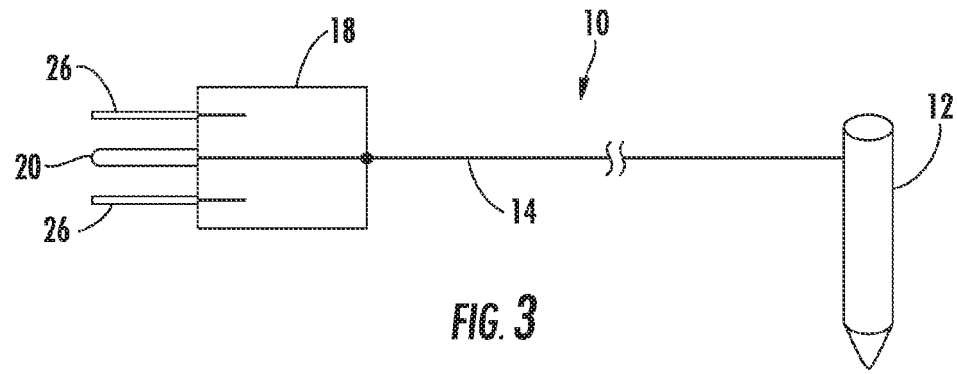
FIG. 3 is a schematic view of the plant media grounding device of the present invention.

FIG. 3 is a schematic diagram illustrating that the grounding interface 12 is in electrical communication with a conductor within the cord 14 that is in turn in electrical communication with the grounding prong 20 of the plug interface 18. It should be noted that there is no electrical connectivity between the grounding interface 12 and the other prongs 26 of the plug 18 that interface with the hot and neutral components of the building electrical system. In fact, in this embodiment these prongs 26 in the plug may be formed from an insulative material, such as a plastic to prevent contact with household electrical currents.

Figure 4:
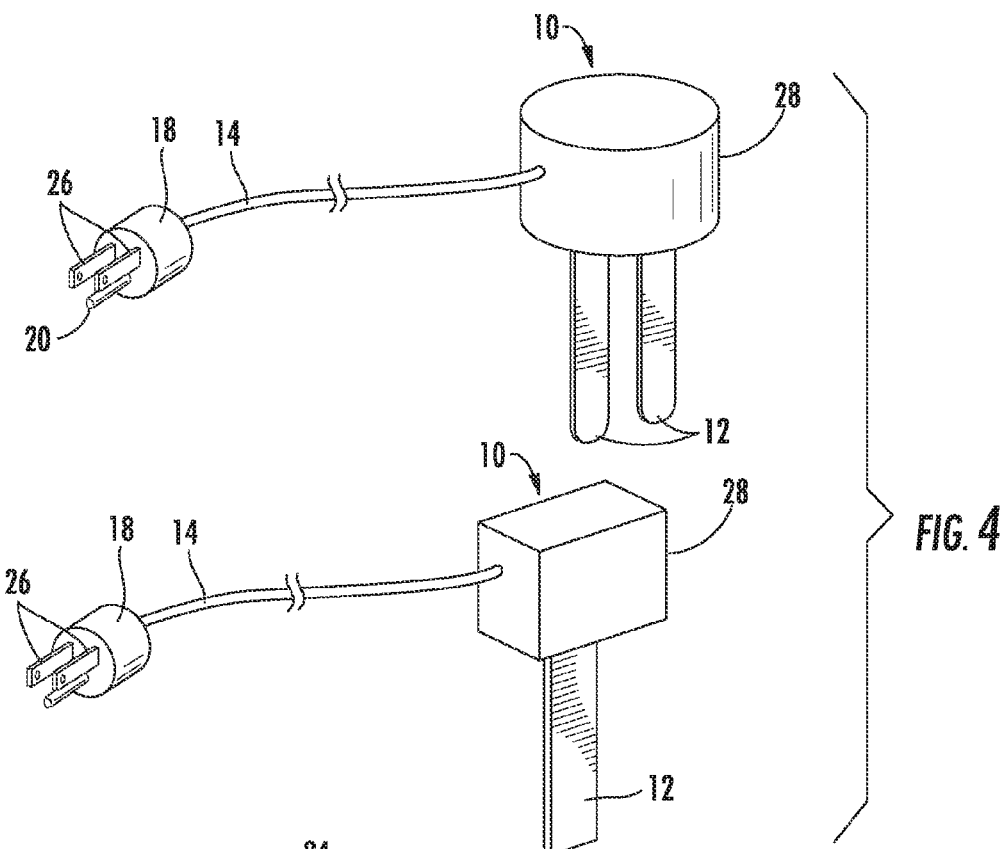
FIG. 4 depicts alternate configurations of the plant media grounding device of the present invention.

It should be appreciated by one skilled in the art that the grounding system may be accomplished using various designs including but not limited to one and/or two pronged grounding interfaces devices such as are shown at FIG. 4. It can also be seen that a head 28 may be provided that serves as a means for handling the device as well as a location within which connections between the interface cord 14 and grounding interface 12 may be made and concealed.

Figure 5:
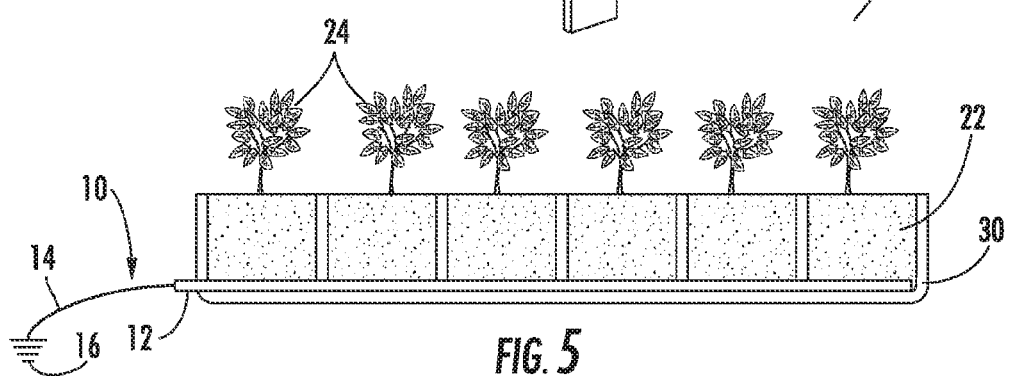
FIG. 5 depicts the plant media grounding device of the present invention in a propagation flat or plant tray.

As can be seen in FIG. 5, the plant media grounding device 10 may be implemented as a propagation flat or plant carrier tray wherein the grounding interface runs along the bottom of the tray or flat 30 and serves to provide electrical grounding for all of the plants 24 propagated therein.

Figure 6:
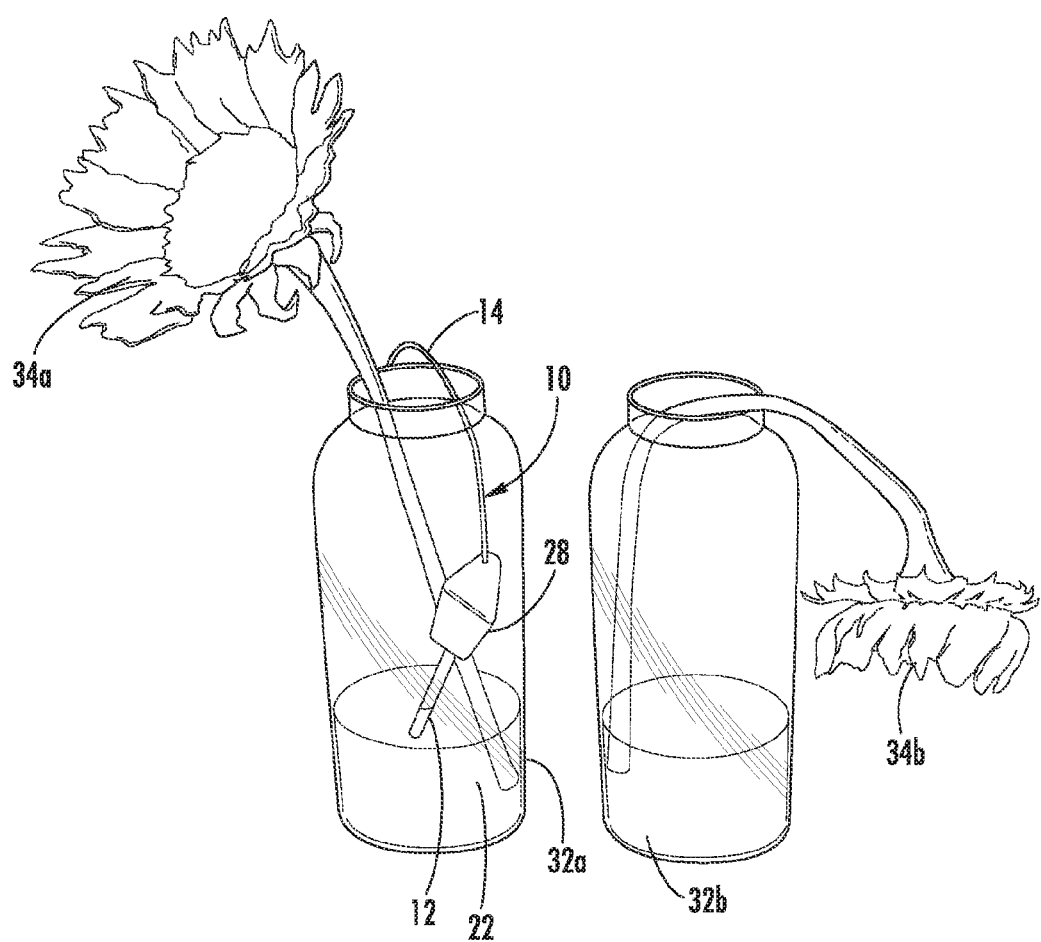
FIG. 6 depicts two flowers, the left one using the plant media grounding device of the present invention.

FIG. 6 illustrates two vases 32a, 32b that had cut flowers 34a, 34b placed into them at the same time. The vase 32a on the left is grounded with the device of the present invention while the vase 32b on the right is untreated. As can be seen, the flower 34a in the vase 32a that is grounded using the plant media grounding device 10 is healthy and vital after a week yet the untreated flower 32b on the right has wilted.

The essence of the present invention is the creation of a connection between a containerized plant that is live or cut and the earth ground. This connection replaces a dual direction energy flow that normally exists in nature but is lost when growing a plant in a container or cutting a plant and placing in a plant media. This earth ground connection not only mitigates stressors and free radical ionization by drawing in energy from the earth, but also utilizes the ambient radiation (celestial, planetary, artificial/man-generated) from its surrounding environment by converting it to a flowing electrical current that is transferred to the ground through the path made possible by this device.

Figure 7:
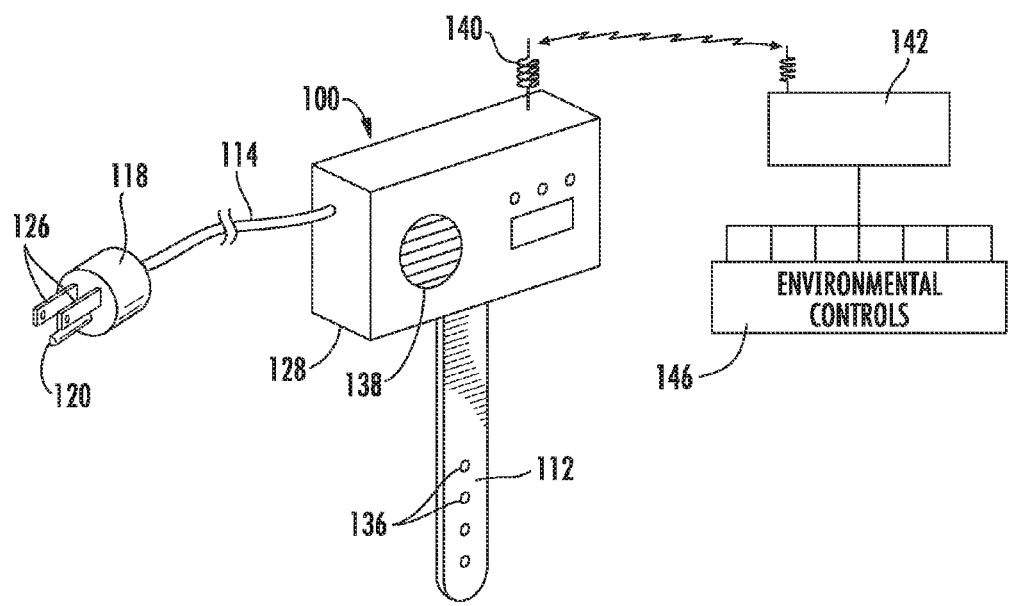
FIG. 7 depicts a system employing an alternate embodiment of the plant media grounding device of the present invention.

In a further embodiment, as depicted at FIG. 7, the plant media grounding device 100 may further include a variety of sensors 136 in order to monitor the progress of the plant and the plant's environment. The device in this embodiment contains sensors 136 capable of recognizing the plant's environment (and potentially variations in the plant itself). When the plant's environment changes out of an optimal range, an "alarm" sounds. The alarm may be audible 138 or may be interfaced to a wireless antenna 140. The alarm may be further interfaced with a computer or some other some form of logic device/controller 142, which in turn actuates various environmental control components 146 of an integrated system. For example, the logic controller 142 may be interfaced with various building systems such as a watering system, nutrient delivery system, humidity control, lighting control, ventilation and/or heating. When the sensors 136 within the plant media grounding device 100 detect a parameter that is out of the desired range, the controller 146 can activate one of the building systems in a manner that adjusts the growing parameters of the plant. Should the plant growing media be dry, the sensor will call for water. If the growing media pH is in an undesirable range, the nutrient delivery system will deliver pH corrective material. If the growing environment is too hot, the ventilation system will be activated. It should be appreciated that the above examples were meant to be illustrative and not meant to limit the scope of potential conditions and interactions that may occur. It is intended within the scope of the present invention that any number of sensors, tracking any number of environmental variables may be tracked and may trigger remedial action should a variable fall outside a desired range.

It can be appreciated by one skilled in the art that should the plant media grounding device 100 include various sensors 136 and electronics therein, the hot and neutral prongs 126 of the plug interface 118 may be formed to be electrically conductive in order to supply power back to the head 128 of the interface for the purpose of supplying power to the electronics contained therein.

It can therefore be seen that the present invention provides a method and system for improved organic cultivation and environmental control over container grown plants that replicates a natural environment whereby the environment of the container grown plant is carefully controlled to allow the plant to dissipate stored electromagnetic energy in a manner that maximizes the health, quality and yield of the plant. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A plant media grounding device comprising:
   a plant media container having plant media therein;
   an electrically conductive grounding interface in electrical communication with said plant media; and
   an electrically conductive interface cord having a first end in electrical communication with said grounding interface and a second end engaged with an earth ground in an electrical receptacle, said second end electrically isolated from hot and neutral connections in said receptacle such that no electricity enters the plant media.

2. The plant media grounding device of claim 1, wherein said grounding interface is selected from the group consisting of: at least one rod, at least one prong and combinations thereof.

3. The plant media grounding device of claim 1, further comprising:
   a male electrical plug having a hot pin, a neutral pin and a grounding pin, said plug affixed to said second end of said interface cord, said electrically conductive interface in electrical communication with only said grounding pin.

4. The plant media grounding device of claim 3, wherein said hot and neutral pins are formed from non-electrically conductive material.

5. The plant media grounding device of claim 1, further comprising:

a head on a top end of said grounding interface covering the connection point between said grounding interface and the interface cord.

6. The plant media grounding device of claim 1, further comprising:
sensors disposed within said grounding interface.

7. The plant media grounding device of claim 6, wherein said sensors monitor the environmental conditions of said plant media.

8. A plant media grounding device comprising:
a plant media container having plant media therein;
an electrically conductive grounding interface in electrical communication with said plant media;
an electrically conductive interface cord having a first end in electrical communication with said grounding interface and a second end engaged with an earth ground in an electrical receptacle, said second end electrically isolated from hot and neutral connections in said receptacle such that no electricity enters the plant media;
sensors disposed within said grounding interface; and
a head on a top end of said grounding interface covering the connection point between said grounding interface and the interface cord.

9. The plant media grounding device of claim 8, wherein said grounding interface is selected from the group consisting of: at least one rod, at least one prong and combinations thereof.

10. The plant media grounding device of claim 8, further comprising:
a male electrical plug having a hot pin, a neutral pin and a grounding pin, said plug affixed to said second end of said interface cord, said electrically conductive interface in electrical communication with only said grounding pin.

11. The plant media grounding device of claim 10, wherein said hot and neutral pins provide power for operation of said sensors.

12. The plant media grounding device of claim 8, further comprising:
a transmitter to transmit information from said sensors.

13. The plant media grounding device of claim 12, wherein said transmitter is wireless.

14. The plant media grounding device of claim 12, further comprising:
a control system to receive the information transmitted from said sensors.

15. The plant media grounding system of claim 14, wherein said control system is interfaced with a variety of environmental control systems, said control system adjusting said environmental controls based on the information received from said sensors.

* * * * *